May 14, 1963  J. E. ROOKUS  3,089,628
FILM PROJECTOR
Filed May 7, 1962

INVENTOR.
JAMES E. ROOKUS
BY
ATTORNEYS

United States Patent Office 3,089,628
Patented May 14, 1963

3,089,628
FILM PROJECTOR
James E. Rookus, Grand Rapids, Mich., assignor of five percent to Edward H. Daverman, Grand Rapids, Mich.
Filed May 7, 1962, Ser. No. 192,747
11 Claims. (Cl. 226—83)

This invention relates to an apparatus for threading film in a film projector. More particularly, this invention relates to an apparatus adapted to simplify the threading of film into a projector and to quickly and automatically facilitate the forming of loops required to advance the film.

This invention is adapted to be used in conjunction with equipment for advancing a film past a member having an opening therein and a light beam for projecting light through the film and opening to project an enlarged picture on another surface for viewing. In such equipment, the film is advanced intermittently, a pair of shafts being provided, one of which is driven and causes the reel thereon to roll up the film after it has passed the projecting lens. Another reel is mounted for free rotation on the other shaft and from this reel the strip of film is withdrawn by the projector mechanism before the film passes the projector lens.

Various forms of apparatus are presently in existence and usually include a number of rollers and cumbersome film clips between the upper and lower shafts to guide the film past the projection aperture. To thread the film for projection, one must carefully pass the film through such rollers, over sprockets provided for intermittent advancement of the film and through such cumbersome film clips so that the film is held securely during projection. Since the path traced by the advancing film must include two loops, one loop prior to its passage in front of the light beam and another loop after it has passed in front of the light beam, great care must be exercised to position these loops while threading the film. If the loops are not properly formed, the film will not advance properly and the film is broken very easily. This threading operation is both difficult and time consuming. In a projector having a means for stopping the advancement of the film and rewinding it to rerun a particular portion of the film, the problems noted as to the threading and loop forming are further multiplied.

My Patent No. 3,018,933, issued January 30, 1962, provides a greatly simplified apparatus for threading film and forming the loops described therein. Other structures are in existence which attempt to solve these problems. The other structures are complicated, cumbersome mechanical gadgets which are both expensive and because of their complicated mechanical structure, are also unsatisfactory for simple operation. These mechanical structures with a great multiplicity of moving, interconnected parts inherently give rise to difficulties in operation and have not been well accepted by projector manufacturers.

An object of this invention is to provide an apparatus adapted to work in conjunction with standard motion picture projectors, simplifying and facilitating the threading of film in such projectors.

A further object of this invention is to provide such an apparatus which is simple in construction, thus easy to fabricate and therefore relatively inexpensive.

A further object of this invention is to provide such an apparatus which has a minimum number of working parts, thereby making it easy to operate and maintain.

Another object of this invention is the provision of such an apparatus which automatically forms loops in a film for advancement in the projector through the mere sliding of a movable member.

A still further object of this invention is to provide an apparatus of the type described with parts so interrelated that film breakage is minimized.

An additional object of this invention is the provision of an apparatus which not only automatically forms loops in the film, but which greatly facilitates the rewinding of the film and the reshowing of various parts thereof.

These and other objects of this invention will become obvious to those skilled in the art of motion picture projectors upon reading the following specification in conjunction with the accompanying drawings, wherein.

Briefly, this invention relates to an apparatus for threading film and forming loops therein utilized in a motion picture projector having a pair of sprockets for intermittent advancement of the film, the sprockets lying generally one above the other. The apparatus includes a movable member slidably mounted on the projector, the member sliding in a generally horizontal direction between the sprockets from a first position for threading a film to a second position for advancing the film. An arm, having two sections movable one with respect to the other, is secured to the top and bottom of this movable member. Means are associated with each of the arms for biasing the sections toward each other and away from the movable member. Guide means for positioning the arms as the member is moved with respect to the projector from the first to the second position are provided, such that in the first position the arms lie away from the sprockets and in the second position one of the sections of each of the arms is biased against the sprockets and the other of the sections of each of the arms extends away from the member to form loops in the strip of film.

Figures 1, 4:
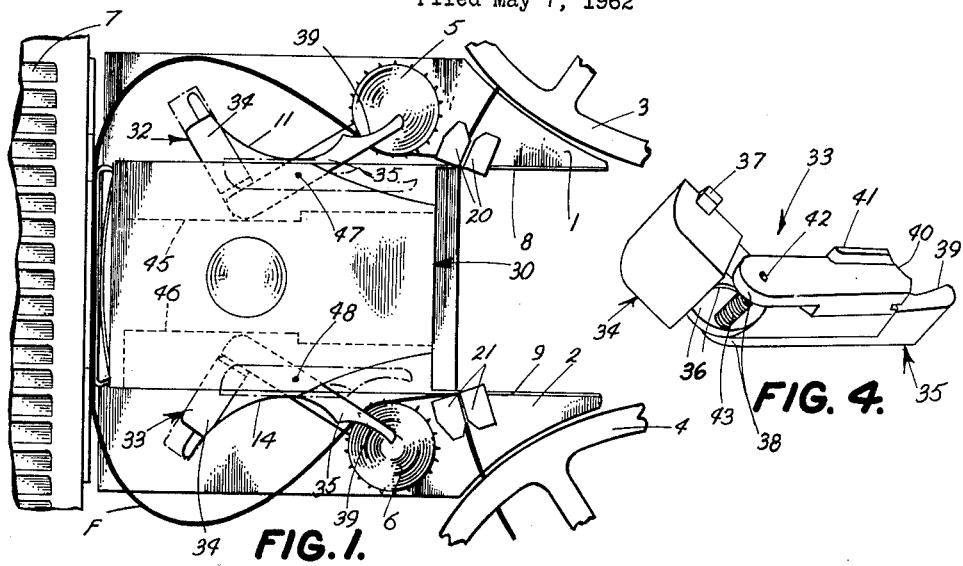
FIG. 1 is a side view of the apparatus embodying this invention, the film being positioned for advancement.
FIG. 4 is a perspective view of the arm mounted in the bottom of the movable member utilized in this apparatus.
Figure 2:
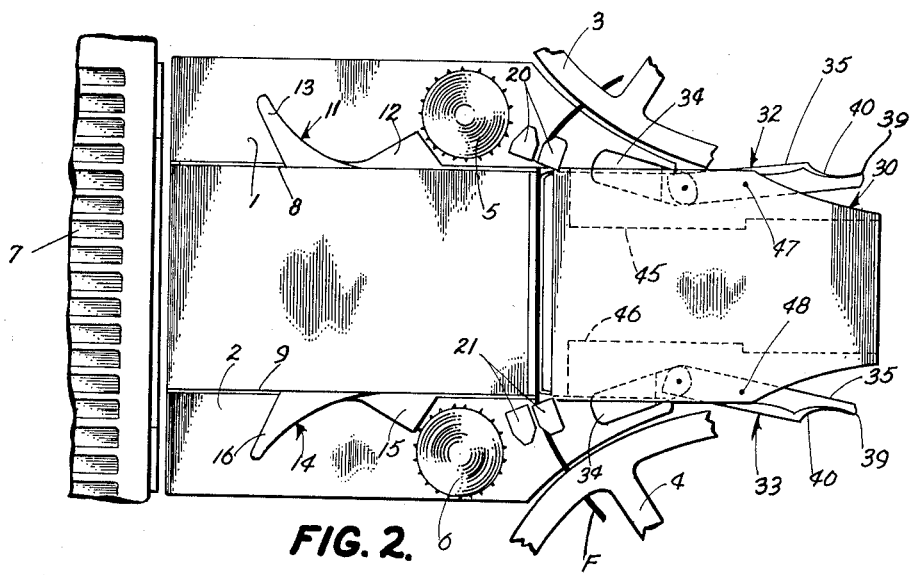
FIG. 2 is a side view of the apparatus shown in FIG. 1, positioned for threading or rewinding of the film.

Referring more specifically to the drawing, the reference numeral 30 designates a movable member slidable within the stationary guides 1 and 2 (FIGS. 1 and 2). These stationary guides are mounted on a projector to lie between the rotating film storage reels 3 and 4 (portions thereof being shown), facilitating movement of the member 30 between these reels. A pair of sprockets 5 and 6 are positioned respectively above and below the slidable member 30, these sprockets being a conventional means for providing intermittent advancement of the film past a projected light beam. The housing for the source of such a beam is designated by the reference numeral 7, it being understood that the stationary guides 1 and 2 may be made an integral part of the projector unit, the guides being shown mounted to a projector merely for purposes of description.

The stationary guides 1 and 2 each include the respective tongues 8 and 9 extending throughout their length. The tongues 8 and 9 are received in and occupy grooves in the top and bottom of the movable member 30, the top groove 31 being shown most clearly in FIG. 3. This facilitates movement of the member 30 between the guides 1 and 2 and assures proper tracking.

The movable member 30 includes a pair of arms 32 and 33 mounted respectively at the top and bottom thereof (FIGS. 1 and 2). Each of these arms includes the same elements and the arm 33 (FIG. 4) will now be described in detail, corresponding elements of the arms 32 and 33 being given like reference numerals. Each arm includes two sections 34 and 35, movable one with respect to the other. The section 34 includes a pair of ears 36 extending from one end thereof and a tab 37 extending from its side. The section 35 includes a pair of ears 38 extending from one end thereof, a finger grip 39 at the other end thereof, a sprocket receiving groove 40 adjacent the finger grip 39 and a tab 41, of a length slightly less than the tab 37 of section 34, extending from the side thereof. A pin 42 extends through the ears 36 and 38, pivotally securing the respective sections 34 and 35 together in an end to end relationship. A coil spring 43 is positioned to envelop the pin 42, the respective ends of the coil spring bearing against the sections 34 and 35. It will be seen that this coil spring thus normally biases the sections 34 and 35 toward each other.

Recesses 45 and 46 are provided in the top and bottom respectively of the movable member 30 (FIGS. 1 and 2). Pins 47 and 48 extend respectively through the top and bottom of the movable member 30, the pins extending through the sections 35 of the arms, thus pivotally securing them to the movable member. It will be seen that the pins extend through the sections 35 of the arm at a point spaced from the pivotal connection to the sections 34, the purpose of which will be explained hereinafter.

It has already been noted that the movable member 30 is adapted to slide between the upper guide 1 and the lower guide 2. Positioned on the outer sides of these guides are a pair of guide means, in the form of indentations 11 and 14 respectively. The areas 12 and 15 of the indentations 11 and 14 extend upwardly and downwardly respectively toward the sprockets 5 and 6. The areas 13 and 16 of the indentations 11 and 14 extend upwardly and downwardly respectively, and are deeper than the areas 12 and 15, as best shown in FIG. 2. Closely spaced knobs 20 and 21 are provided on the guides 1 and 2 respectively, adjacent the sprockets 5 and 6. These knobs receive a strip of film F therebetween for threading the film, to now be described in detail.

*Assembly and Operation*

The upper and lower guides 1 and 2 are mounted on the sides of a standard projector. As noted previously, these guides could be designed as integral parts of the projector. The movable member 30 with its top and bottom movable arms 32 and 33 is mounted between these guides by fitting the tongues 8 and 9 in grooves provided in the top and bottom of the member. The movable member is then free to slide between the guides 1 and 2.

Figure 3:
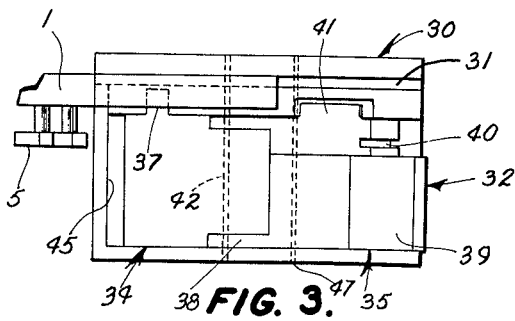
FIG. 3 is a top view of a movable member utilized in the apparatus shown as positioned in FIG. 2.

When one is threading film, one need merely move the member 30 to its extreme right position (FIG. 2) and draw the film F from the reel 3 between the knobs 20, down between the knobs 21 and wind it on the reel 4. It will be noted that the movable member 30 permits the film to pass in a straight line between the knobs 20 and 21 because of the movable member's withdrawal from this area. Thus, the initial film threading operation is greatly simplified. As shown in FIG. 2, the arms 32 and 33 are held in almost a common plane, the guides holding the tabs 37 closely adjacent the movable member (FIG. 3). The movable member 30 is then moved to the left, drawing the film F with it to the position shown in FIG. 1. As the movable member travels to the left, the tabs 37 of the arms enter the areas 13 and 16 of the indentations 11 and 14. The tabs 41, being shorter than the tabs 37 as shown in FIG. 3, enter the areas 12 and 15 of the indentations 11 and 14. The sprocket grooves 40 of the sections 35 of the arms hold the film F against the sprockets 5 and 6. The sections 34 of the arms automatically form loops in the film F, this being accomplished through the spring 43 forcing the sections 34 to follow the areas 13 and 16 of the indentations 11 and 14. If one wishes to form the larger loops shown in FIG. 1, one's fingers may be placed on the finger grips 39 and the grips pinched together, which forces the sections 34 of the arms to the position shown in dotted lines in FIG. 1, this being accomplished because the sections 35 of the arms are pivoted to the movable member at points spaced from the pivotal end to end connections of the sections 34 and 35. Upon release of the finger grips 39, the arms 32 and 33 return to the position shown in solid lines in FIG. 1, larger loops having been formed.

By simply depressing the finger grips 39 toward each other, the movable member 30 may be moved back to the position shown in FIG. 2. It will now be seen that the film may be reversed to show a certain portion of the film again, or may be entirely rewound. By simply moving the movable member 30 to the left, the sections 35 of the arms engage the film for intermittent movement with the sprockets and the sections 34 providing loops in the film F.

It will now be seen that this invention has provided an extremely simplified structure, having a minimum number of working parts, yet automatically forming loops in a film. The initial threading of the film is simple, allowing even a child to easily operate the machine. The loops are formed in such a manner that mistakes cannot be made. If larger loops are desired, this can be accomplished by merely pressing the finger grips 39 together when the movable member is positioned as shown in FIG. 1. The apparatus engages the film such that larger loops may be formed in the film by so depressing the finger grips 39, even while the projector is running and the film is being advanced. Since the size of the loop is so important and the use of loops of improper sizes being a major cause of film damage, it will be seen that this automatic formation of loops is a definite step forward in the art.

While only one embodiment of this invention has been shown and described, it will be obvious that certain other embodiments may be utilized to practice this invention without departing from the spirit and scope thereof. Such other embodiments are to be included as part of this invention unless the following claims expressly state otherwise.

I claim:

1. In a motion picture projector having a pair of sprockets for intermittent advancement of the film, the sprockets lying generally one above the other, apparatus for threading film and forming loops therein, comprising: a movable member slidably mounted on the projector, said member slidable in a generally horizontal direction between the sprockets from a first position for threading a film to a second position for advancing the film; a pair of arms each having two sections movable one with respect to the other, one of said arms secured at the top and the others secured at the bottom of said movable member; means associated with each of said arms for biasing said sections toward each other and away from said member; guide means for positioning said arms as said member is moved with respect to the projector from said first to said second position, in said first position said arms lying away from the sprockets and in said second position one of said sections of each of said arms biased against the sprockets and the other of said sections of each of said arms extending away from said member to form loops in the strip of film.

2. Structure as defined in claim 1, said sections of each of said arms pivotally joined end to end and having a spring member bearing against the undersides thereof.

3. Structure as defined in claim 1, the side walls of said member extending respectively upwardly and downwardly from the top and bottom of said member, said arms pivotally secured between said side walls.

4. Structure as defined in claim 1, said guide means comprising tabs on said arms cooperating with indentations on the projector adjacent said movable member.

5. In a motion picture projector having a pair of sprockets for intermittent advancement of the film, the sprockets lying generally one above the other, apparatus for threading film and forming loops therein, comprising: a movable member slidably mounted on the projector, said member slidable in a generally horizontal direction between the sprockets from a first position for threading a film to a second position for advancing the film; the side walls of said member extending respectively upwardly and downwardly from the top and bottom of said member; a pair of arms each having two sections movable one with respect to the other, one of said arms being pivotally secured between said side walls at the top and the other being pivotally secured between said side walls at the bottom of said movable member; means associated with each of said arms for biasing said sections toward each other and away from said member; guide means for positioning said arms as said member is moved with respect to the projector from said first to said second position, in said first position said arms lying generally flush with the top and bottom of said member and in said second position one of said sections of each of said arms biased against the sprockets and the other of said sections of each of said arms extending away from said member to form loops in a strip of film.

6. Structure as defined in claim 5, the end of said one of said sections of each of said arms pivotally joined to the end of said other section, said one section pivotally secured between said side walls at points spaced from said other section.

7. Structure as defined in claim 6, said one section of each of said arms including a pair of ears receiving a portion of said other section therebetween, a coil spring positioned under said sections, one end of said spring engaging each of said sections under tension, and a pivot pin passing through said ears, said coil spring and said other section.

8. Structure as defined in claim 6, said one section of each of said arms including grooves for positioning of the film.

9. Structure as defined in claim 5, said one section of each of said arms including finger tabs for manually moving said arms.

10. Structure as defined in claim 6, said one section of each of said arms including finger tabs for manually moving said arms.

11. Structure as defined in claim 5, said guide means comprising tabs on said arms cooperating with indentations on the projector adjacent said movable member.

References Cited in the file of this patent
UNITED STATES PATENTS

| | | |
|---|---|---|
| 1,865,107 | Howell | June 28, 1932 |
| 2,472,143 | Briskin | June 7, 1949 |
| 3,018,933 | Rookus | Jan. 30, 1962 |